US011599397B2

(12) United States Patent
Ramachandran et al.

(10) Patent No.: US 11,599,397 B2
(45) Date of Patent: Mar. 7, 2023

(54) COLLABORATION SERVICE TO SUPPORT CROSS-PROCESS COORDINATION BETWEEN ACTIVE INSTANCES OF A MICROSERVICE

(71) Applicant: EMC IP Holding Company LLC, Hopkinton, MA (US)

(72) Inventors: Madhu M. Ramachandran, Cary, NC (US); Scott E. Joyce, Foxboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 549 days.

(21) Appl. No.: 16/779,632

(22) Filed: Feb. 2, 2020

(65) Prior Publication Data
US 2021/0240544 A1 Aug. 5, 2021

(51) Int. Cl.
*G06F 9/50* (2006.01)
*G06F 9/52* (2006.01)
*G06F 8/30* (2018.01)
*G06F 9/26* (2006.01)
*H04L 67/10* (2022.01)

(52) U.S. Cl.
CPC .............. *G06F 9/52* (2013.01); *G06F 8/316* (2013.01); *G06F 9/262* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,212,041 B1* | 2/2019 | Rastogi | H04L 41/40 |
| 10,389,602 B2* | 8/2019 | Chang | H04L 41/5045 |
| 10,581,820 B2* | 3/2020 | Keshava | H04L 9/0894 |
| 10,735,509 B2* | 8/2020 | Li | G06F 9/5088 |
| 10,958,757 B2* | 3/2021 | Appajanna | H04L 67/60 |

(Continued)

OTHER PUBLICATIONS

Cinque et al. "Advancing Monitoring in Microservices Systems", 2019 IEEE, pp. 122-123.*

(Continued)

*Primary Examiner* — Van H Nguyen
(74) *Attorney, Agent, or Firm* — Ryan, Mason & Lewis, LLP (57) ABSTRACT

Techniques are provided for enabling cross-process coordination between multiple instances of given microservice in a cloud computing system. A method includes running a plurality of active instances of a given microservice of a computing system comprising a distributed microservices architecture. A first active instance of the plurality of active instances executes a portion of program code of the given microservice to perform a job. The portion of the program code of the given microservice includes an instance synchronization element which is configured to enable cross-process coordination between the plurality of active instances of the given microservice with the support of a collaboration service. The first active instance utilizes the instance synchronization element to communicate with the collaboration service and cause the collaboration service to execute a process associated with the instance synchronization element to thereby implement the cross-process coordination between the plurality of active instances for executing the job.

20 Claims, 4 Drawing Sheets

(56) References Cited

U.S. PATENT DOCUMENTS

| | | | |
|---|---|---|---|
| 11,042,473 B2* | 6/2021 | Joyce | G06F 11/3692 |
| 11,233,826 B2* | 1/2022 | Nakagoe | H04L 63/20 |
| 2017/0331802 A1* | 11/2017 | Keshava | H04L 9/0894 |
| 2020/0162578 A1* | 5/2020 | Appajanna | H04L 67/62 |

OTHER PUBLICATIONS

Wang et al. "Constructing a Service Software with Microservices", 2018 IEEE, pp. 43-44.*
Dell EMC, "A Proactive Monitoring and Analytics Application for Dell EMC Storage Systems," CloudIQ Detailed Review, Jan. 2019, 42 pages.
Zookeeper, The Apache Software Foundation, pp. 1-10, 2008.

* cited by examiner

COLLABORATION SERVICE TO SUPPORT CROSS-PROCESS COORDINATION BETWEEN ACTIVE INSTANCES OF A MICROSERVICE

FIELD

This disclosure relates generally to techniques for managing services in a distributed computing environment.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, Software-as-a-Service (SaaS), Infrastructure-as-a-Service (IaaS), and/or Platform-as-a-Service (PaaS). A cloud computing system implements an application programming interface (API) to enable various applications and computing platforms to communicate with and access the cloud computing system, or otherwise allow other applications and computing platforms to integrate within the cloud computing system.

A cloud computing service can implement a microservice architectural style approach to developing a single application, or product, as a suite of small services. In a distributed microservices computing environment, each microservice runs in its own process and communicates with other microservices using lightweight protocols such as HTTP. Microservices are commonly designed to enable the microservices to be "scaled up" by increasing the number of instances of the microservices as needed to support increased workloads and/or to provide high availability in the case of failures. In some cases, the set of active instances of a given microservices are not truly independent, such that the instances will need to coordinate to ensure full potential of the processing and memory resources that are available to such instances.

SUMMARY

Exemplary embodiments of the disclosure include methods for enabling cross-process coordination between multiple instances of given microservice in a cloud computing system. For example, in one embodiment, a method comprises running a plurality of active instances of a given microservice of a computing system comprising a distributed microservices architecture. A first active instance of the plurality of active instance executes a portion of program code of the given microservice to perform a job, wherein the portion of the program code of the given microservice comprises an instance synchronization element that is configured to enable cross-process coordination between the plurality of active instances of the given microservice with the support of a collaboration service. The first active instance utilizes the instance synchronization element to communicate with the collaboration service and cause the collaboration service to execute a process associated with the instance synchronization element to thereby implement the cross-process coordination between the plurality of active instances for executing the job.

In some embodiments, the instance synchronization element comprises an aspect that configured using an aspect-oriented programming paradigm.

Other embodiments of the disclosure include, without limitation, computing systems and articles of manufacture comprising processor-readable storage media for enabling cross-process coordination between multiple instances of given microservice in a cloud computing system.

DETAILED DESCRIPTION

Exemplary embodiments of the disclosure will now be described in further detail with regard to systems and methods for enabling cross-process coordination between multiple instances of given microservice. As explained in further detail below, cross-process coordination between instances of a given microservice is implemented using instance synchronization elements that are inserted into the microservice program code, and using a microservice instance collaboration service that is configured to support the cross-process coordination between multiple instances of given microservice based on the instance synchronization elements. In some embodiments, instance synchronization elements are implemented using aspect-oriented programming (AOP).

Figure 1:
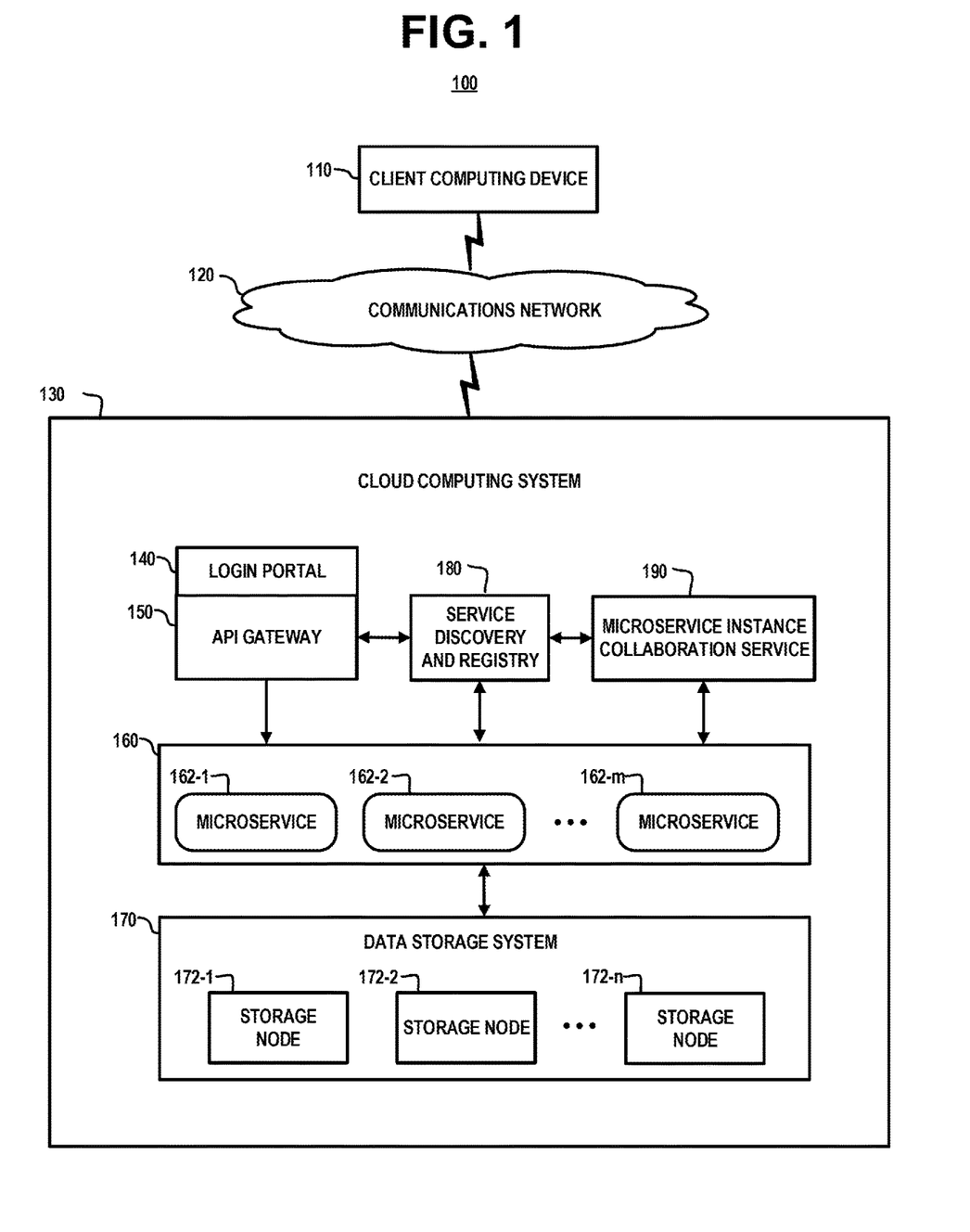
FIG. 1 is a high-level schematic illustration of a cloud computing system which comprises a distributed microservices architecture and a microservices instance collaboration service to support cross-process coordination between microservice instances, according to an exemplary embodiment of the disclosure.

FIG. 1 is a high-level schematic illustration of a cloud computing system which comprises a distributed microservices architecture and a microservices instance collaboration service to support cross-process coordination between microservice instances, according to an exemplary embodiment of the disclosure. More specifically, FIG. 1 schematically illustrates a system 100 which comprises a client computing device 110, a communications network 120, and a cloud computing system 130. The cloud computing system 130 comprises a user login portal 140, an API gateway 150, an application platform 160, a data storage system 170, a service discovery and registry module 180, and a microservice instance collaboration service 190 (alternatively referred to herein as a collaboration service 190).

The client computing device 110 comprises one of various types of computing systems or devices such as a desktop computer, a laptop computer, a workstation, a computer server, an enterprise server, a rack server, a smart phone, an electronic tablet, etc., which can access the cloud computing system 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols.

The cloud computing system 130 is configured to perform data processing, data storage, and data management functions to support one or more cloud-based or web-based applications or services and/or other types of applications that are implemented by the application platform 160. The data storage system 170 comprises a plurality of data storage nodes 172-1, 172-2, . . . , 172-n (collectively, data storage nodes 172). The data storage system 170 can be implemented using any suitable data storage system, or combination of data storage systems, including, but not limited to storage area network (SAN) systems, Hadoop Distributed File System (HDFS), as well as other types of data storage systems comprising clustered or distributed virtual and/or physical infrastructure. In some embodiments, the data storage nodes 172 comprise storage appliances with memory controllers, processors, cache memory, and non-volatile storage media to provide persistent storage resources (e.g., file repositories, databases, etc.) for the application platform 160 and other computing nodes of the cloud computing system 130.

The data storage devices of the data storage nodes 172 may include one or more different types of persistent storage devices, or data storage arrays, such as hard disk drives or solid-state drives, or other types and combinations of non-volatile memory. In one embodiment, the data storage nodes 172 are implemented using, for example, an enterprise-class storage platform comprising high-performance, scalable storage arrays, which can be implemented for hyper-scale computing systems. For example, the data storage system 170 can be implemented using commercially available storage array systems and applications.

In the exemplary embodiment of FIG. 1, the application platform 160 comprises a microservices-based architecture which includes plurality of microservices 162-1, 162-2, . . . , 162-m (collectively, microservices 162) that are combined to provide a structured application. As is known in the art, a microservices-based framework implements an application as a collection of loosely-coupled services, wherein the services expose fine-grained APIs and lightweight protocols. Each microservice 162-1, 162-2, . . . , 162-m comprises a self-contained software module with associated functionality and interfaces. In some embodiments, the microservice-based application platform 160 runs in a virtualized environment (e.g., virtual machines) or a containerized environment (e.g., containers) in which the number of instances of a given microservice and the locations (e.g., host and port) of such instances change dynamically.

In the microservices architecture, each microservice 162 (and instances thereof) exposes a set of fine-grained endpoints to access resources provided by the microservice. Each endpoint specifies a location from which APIs can access the resources needed to perform functions. Each microservice 162 maintains its own database in the data storage system 170 in order to be decoupled from other microservices. Data consistency between the distributed microservices 162 is implemented using known techniques such as the Saga pattern. The microservice-based framework enables the individual microservices 162 to be deployed and scaled independently, to be developed and updated in parallel by different teams and in different programming languages, and to have their own continuous delivery and deployment stream. While the application platform 160 is generically depicted in FIG. 1, the application platform 160 can implement any suitable cloud-based application (e.g., multi-tenant SaaS application). For example, the application platform 160 can implement a cloud-based SaaS application that allows customers to monitor, analyze, and troubleshoot their storage systems, or any other type of SaaS application which comprises hundreds or thousands of microservices and associated endpoints.

The login portal 140 and the API gateway 150 allow client applications running on client devices (e.g., client computing devices 110) to access the individual microservices 162 of the application platform 160. More specifically, the login portal 140 comprises a user interface which implements methods that allow a user to connect to the cloud computing system 130 (via a computing device 110) and login to the cloud computing system 130 and provide credentials for a user authentication/verification process. In some embodiments, the login portal comprises different user interfaces to support connectivity with different type of devices, e.g. mobile devices, desktop computers, servers, etc., and different types of HTML-based browsers.

The API gateway 150 implements methods that are configured to enable client applications to access the services of the microservices-based application platform 160. In particular, the API gateway 150 provides a single entry point for client applications to issue API requests for services that that are provided by the application platform 160. The API gateway 150 abstracts the client applications from knowing how the application platform 160 is partitioned into microservices, and from having to determine the locations of service instances. The API gateway 150 comprises logic for calling one or more of the microservices 162 in response to a client request. The API gateway 150 communicates with client applications and the microservices 162 using any suitable API framework. For example, in some embodiments, the API gateway 150 and the microservices 162 implement a REST API. In other embodiments, the API gateway 150 and the microservices 162 implement a SOAP API.

In some embodiments, the API gateway 150 is implemented using a single gateway service that is configured to interface with many different types of client applications (e.g., web-based applications, mobile applications, etc.). In other embodiments, the API gateway 150 comprises a plurality of gateway services, each configured to interface with a different type of client application. In all instances, the API gateway 150 performs various functions. For example, the API gateway 150 functions as a reverse proxy to redirect or route requests from client applications to target endpoints of the microservices 162. In this instance, the API gateway 150 provides a single endpoint or Uniform Resource Locator (URL) to receive requests from client applications for access to services of the application platform 160, and internally maps client requests to one or more of the microservices 162.

Furthermore, the API gateway 150 implements aggregation services to aggregate multiple client requests (e.g., HTTP requests) which target multiple microservices 162 into a single request. In this instance, a client application may send a single request to the API gateway 150 to perform a single task, and the API gateway 150 dispatches multiple calls to different backend microservices 162 to execute the task. The API gateway 150 aggregates the results from the multiple microservices and sends the aggregated results to the client application. In this instance, the client application issues a single request and receives a single response from the API gateway 150 despite that the single request is parsed and processed by multiple microservices 162. The API gateway 150 can be configured to implement other functions or microservices to implement authentication and authorization, service discovery, response caching, load balancing, etc.

The service discovery and registry module 180 is configured to perform various methods to support service discovery and registration. For example, the service discovery and registry module 180 generates and maintains a database of the available microservices 162 of the application platform 160, including a list of all currently executing instances of the microservices 162 and the network locations (IP address and port) of all instances of the microservices 162. The service registry is utilized for service discovery. In the distributed microservices environment of the cloud computing system 130, the microservice instances have dynamically assigned network locations because the available set of microservice instances changes dynamically as a result of auto scaling, failures, continual upgrades, etc. The network location of a given microservice instance is registered with the service registry when it starts up, and then removed from the service registry when the given microservice instance terminates. Furthermore, the service discovery and registry module 180 implements client-side discovery and/or server-side discovery methods that are configured to utilize the service registry to determine the network locations of available microservice instances and to support load balancing across the available microservice instances.

The microservices registration information of the service registry is leveraged in various ways. For example, the API gateway 150 utilizes the service discovery and registry module 180 to identify available instances of the microservices 162 and the network locations of such microservice instances to support client request routing and load balancing functions. In addition, the running instances of the a given microservice utilize the service discovery and registry module 180 to determine the currently available instances and network locations of the collaboration service 190 when coordination between the executing instances of the given microservice is needed. In addition, the collaboration service 190 utilizes the service discovery and registry module 180 to identify the active instances of a given microservice and to determine the network location of such instances, when cross-process coordination is needed between the microservice instances of the given microservice.

Figure 2:
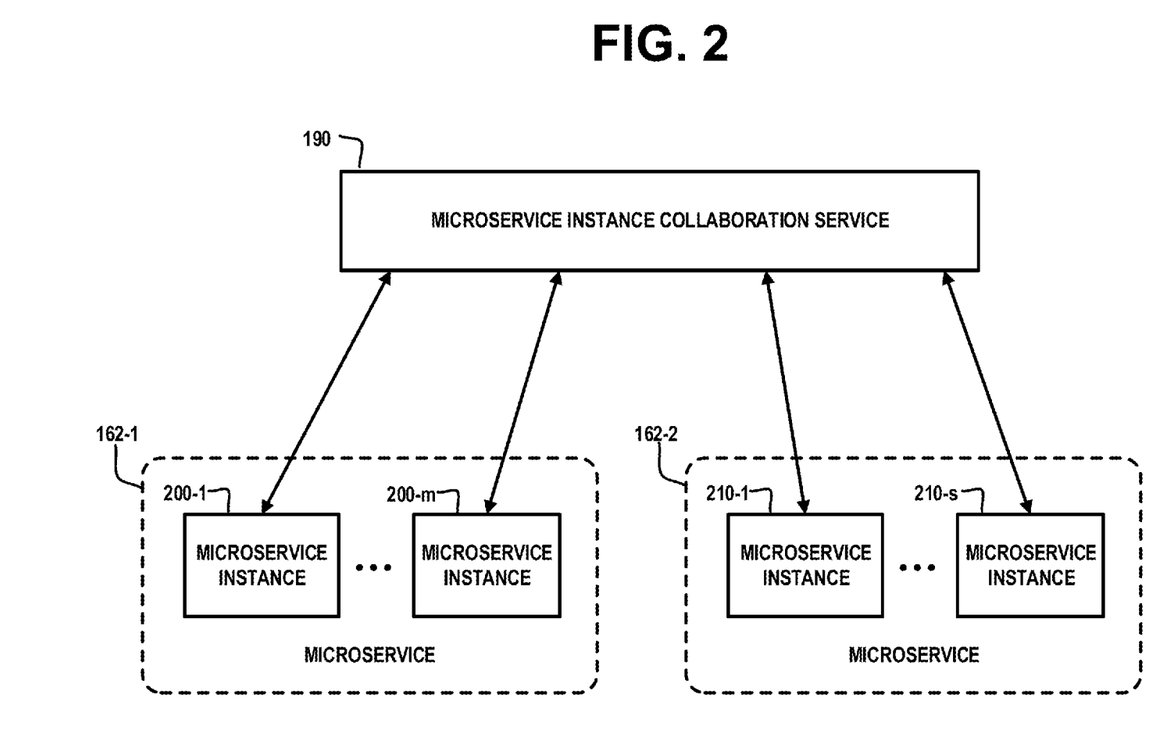
FIG. 2 schematically illustrates a method for implementing a microservices instance collaboration service to support cross-process coordination between instances of a microservice, according to an exemplary embodiment of the disclosure.

FIG. 2 schematically illustrates a method for implementing a microservices instance collaboration service to support cross-process coordination between instances of a microservice, according to an exemplary embodiment of the disclosure. In particular, FIG. 2 illustrates an exemplary embodiment in which the collaboration service 190 of FIG. 1 is in operative communication with a plurality of microservices 162-1 and 162-2 of the application platform 160, wherein the microservices 162-1 and 162-2 each have plurality of active instances. For example, the microservice 162-1 comprises a plurality (m) of active microservice instances 200-1, . . . , 200-$m$ (collectively, microservice instances 200), and the microservice 162-2 comprises a plurality (s) of active microservice instances 210-1, . . . , 210-$s$ (collectively, microservice instances 210).

As further depicted in FIG. 2, the active instances 200 of the microservice 162-1 communicate and coordinate their processes through the collaboration service 190, and the active microservice instances 210 of the microservice 162-2 communicate and coordinate their processes through the collaboration service 190. The collaboration service 190 is not externally exposed to end-users or customers, rather the collaboration service 190 is an internal feature that is exposed and accessible by, e.g., core microservices 162 of the application platform 160. As shown in FIG. 2, the collaboration service 190 is configured to manage cross-process communication between multiple instances of a given microservice, and can support multiple sets of active instance of multiple microservices. Indeed, while FIG. 2 illustrates the collaboration service 190 in operative communication with the active instances of two microservices, the collaboration service 190 is configured to provide support for more than two microservices (e.g., tens or hundreds of microservices, etc.). In some embodiments, the collaboration service 190 is itself a microservice, which can be dynamically scaled by instantiating multiple active instances of the collaboration service 190, depending on the number core microservices 162 and amount of workload being handled by the collaboration of service 190 at a given point in time.

The collaboration service 190 is configured to provide various services to support the core microservices of the cloud computing system 130. For example, in some embodiments, the collaboration service 190 implements load balancing methods to distribute a workload among a set of active instances of a given microservice. In addition, the collaboration service 190 implements methods to support distributed cross-instance thread locking among a set of active instances of a given microservice. Furthermore, the collaboration service 190 implements methods to control and manage microservice-level outgoing thread pool count/usage across a set of active instances of a given microservice. Moreover, the collaboration service 190 implements methods to support general microservice-level communication across a set of active instances of a given microservice. In this regard, the collaboration service 190 allow the microservice instances within a given domain/application to share the same pattern without having to duplicate efforts and resources.

While there are circumstances under which a set of active instances of a given microservice can operate independently from each other without coordination, there are various circumstance in which the active instances of a given microservice need to be aware of each other to thereby coordinate the execution of a process, update/modify a parameter, etc. In these instances, the collaboration service 190 is configured to enable cross-process coordination between active instances of a given microservice by executing program code that is associated with instance synchronization elements that are inserted into the program code of a microservice. As noted above, in some embodiments, the instance synchronization elements are modularized program components that are implemented using AOP.

As is known in the art, AOP is a programming paradigm that is configured to enhance modularity through the separation of "cross-cutting concerns." Cross-cutting concerns are "aspects" of a program that affect other "concerns." An "aspect" of a program is a feature that is linked to other portions of the program, but which is not related to a primary function of the program. AOP enables the separation of cross-cutting concerns by adding additional content (e.g., an advice) to existing code without modifying the program code (e.g., microservice code) itself. This allows functions that are not central to the core logic (e.g., logging) to be added to a program without cluttering the code that is core to the functionality.

More specifically, AOP addresses cross-cutting concerns by utilizing stand-alone program modules, referred to as aspects, wherein an aspect comprises code that is executed at particular point (e.g., pointcut) of the core program code. Whenever the execution of a given program (e.g., microservice code) reaches a "join point" described in the pointcut, a piece of code (e.g., advice) that is associated with the pointcut is executed. This allows a programmer to describe where and when additional code should be executed in addition to the already defined function/behavior.

By way of example, assume there is a program that allows a user to modify records in a database. Assume further that when a user attempts to modify the database, the database system requires a log to be generated to identify the user who is attempting to modify the database. In a conventional programming scheme, the program may first call a logging method before calling a database modification method. On the other hand, with AOP, a pointcut can be applied to the database modification method to have an advice that is called to log the requisite information whenever the program thread enters the database modification method. In this example, the pointcut refers to the point of execution in the program at which cross-cutting concern needs to be applied, e.g., a pointcut is reached when the program thread enters a method, and another pointcut is reached when the program thread exits the method. The combination of the pointcut and the advice is deemed an aspect. In the example above, a logging aspect is added to the program by defining a pointcut and adding the desired advice.

In some embodiments of the disclosure, modular instance synchronization elements, such as AOP-based aspects, are inserted within the program code of a microservice to enable cross-process coordination between active instances of a given microservice with the support of the collaboration service 190. For example, a modular instance synchronization element can be included in the program code of a given microservice to enable the collaboration service 190 to control distributed cross-instance thread locking between active instances of the given microservice. In a microservice architecture, each microservice instance is stateless. However, in certain instances, there are critical sections of the microservice code which should be executed by only one active instance of the microservice (e.g., application initialization, executing a scheduled job, etc.).

In this instance, the collaboration service 190 can be configured to provide a fast memory-based distributed locking mechanism, in which a key is utilized to implement a lock of a given portion (e.g., process) of the microservice code. In an exemplary embodiment, the key comprises Microservice_name: Instance_ID: method_name. In some embodiments, the lock has a timeout that is implemented using an auto expire function/parameter. In this manner, the lock can be implemented with an automatic timeout (after a specified period of time) to handle cases wherein the instance that is given the lock crashes, fails, etc.

By way of example, assume that a given active instance of a microservice is executing a process that should only be performed by one active instance of a plurality of active instances of the microservice. For example, assume that the process involves creating a database schema. In this example, a portion of the microservice program code for creating a database schema can be augmented with an instance synchronization element that allows a given instance of the microservices to acquire a lock on that portion of the microservice program code so that only a single instance will execute the process for creating the database schema. In particular, in an exemplary embodiment, the instance synchronization element is configured to direct the given microservice instance executing such code to communicate with the collaboration service 190 to request and reserve a lock on the microservice process for creating the database schema, while preventing other active instances of the microservice to execute the microservice code for creating the database schema. In response to the request, the collaboration service 190 will generate the lock and associated key and store the key within an in-memory database that is utilized by the collaboration service 190. Thereafter, when the given microservice instance is finished creating the database scheme and exits the database creation method, the microservice instance will communicate with the collaboration service 190 to release the lock.

The use of an instance synchronization element as a means for an active microservice instance to obtain a lock on a section of microservice code across any number of instances can be implemented for any process or function in which it is desired or otherwise required that the process or function be performed by only one active instance of a plurality of active instances of a given microservice (e.g., performing a scheduled job, sending an e-mail notification, etc.). The following code represents a generic framework for implementing an instance synchronization element using, e.g., AOP programming techniques, to obtain a lock with or without a timeout:

```
@InstanceSync or @InstanceSync(lockTimeout=60)
public void myCriticalMethod( ){
...
}
```

In other embodiments, the code associated with an instance synchronization element for obtaining a lock on a process or function associated with a given section of microservice code can be configured to direct the collaboration service 190 to select a given active instance out of the set of currently active instances of the given microservice to perform the given process or function. In particular, when a given microservice instance communicates with the collaboration service 190 to request a lock on a portion of the microservice code for performing a given job or function, e.g., creating the database schema, the collaboration service 190 can be configured to select and direct another non-requesting active microservice instance to perform the given function, and then generate a lock to enable the selected microservice instance to perform the given job or function.

In another exemplary embodiment, the collaboration service 190 can be configured to support collaboration among a plurality of active instances of a given microservice by coordinating the sharing of data among the plurality of active instances. For example, when one microservice instance of a given microservice sets an in-memory value of the microservice, a process can be implemented to broadcast the in-memory value to all other active microservice instances of the given microservice to update the same in-memory value of all such active microservice instances.

By way of example, data sharing collaboration can be applied in a log setting operation, wherein the setting a value of a given log level, e.g., DEBUG log level, in one microservice instance causes the collaboration service 190 to direct all other active instances to set the same value of the given log level for such instances. In some embodiments, data sharing collaboration can be implemented by adding an instance synchronization element (e.g., AOP aspect) on a setter method which will automatically publish the updated value to the collaboration service 190 for sharing with other active instances.

For example, a given instance of a microservice can receive an API request with a POST method to change a given value. In this instance, the setter method that is used to change the given value in response to the POST operation of the given API request can have an instance synchronization element (e.g., AOP aspect) which enables the given instance to communicate with the collaboration service 190 and cause the other active instances to update the same value. In general, instance synchronization elements can be added to getter and setter methods to coordinate data sharing among active instances of a given microservice. In particular, instance synchronization elements according to exemplary embodiments of the disclosure can be utilized in conjunction with getter and setter methods for retrieving and updating value of a variable. A setter method updates the value of a variable, and a getter method reads a value of a variable. In other embodiments, an instance synchronization element (e.g., AOP aspect) can include a custom "marker annotation" which can be used on a given field, to thereby support the coordinated sharing of data among the plurality of active instances.

In other embodiments, the collaboration service 190 implements methods that are configured to distribute the workload for a scheduled job among multiple active instances of a given microservice that is responsible for executing the scheduled job. In general, a single instance of a microservice is utilized to run a scheduled job. But if the job involves heavy processing, the collaboration service 190 can proceed to distribute the workload among multiple active instances of the microservice. For example, assume a scheduler wakes up and triggers a given instance (instance A) of a microservice to process 1000 user entries in database. The instance can communicate with the collaboration service 190 and request the collaboration service 190 to identify and select a number of instances and distribute the load by passing batches of user IDs to different instances.

In other embodiments, the collaboration service 190 implements methods that are configured to manage outgoing thread pool usage. Similar to the above pattern used to share data across instances, we can share data across instances based on the logic of the collaboration service 190 given the number of instances running. For example, consider a situation where a given microservice needs to communicate with another external service, wherein the external service limits the number of calls (e.g., 10 calls) that can be made to the external service in parallel pursuant to a service level agreement. Assuming there are two active instances of the given microservice running, each instance can be accorded a local thread pool count of 5. If the given microservice is scaled to three active instances, the thread pool allocation to the three instances can be, for example, 3, 3, and 4. In this exemplary usage scenario, the collaboration service 190 would be aware of the current number of active instances of the microservice and proceed to automatically adjust the outgoing thread pool usage among the current number of active instances, as desired.

Figure 3:
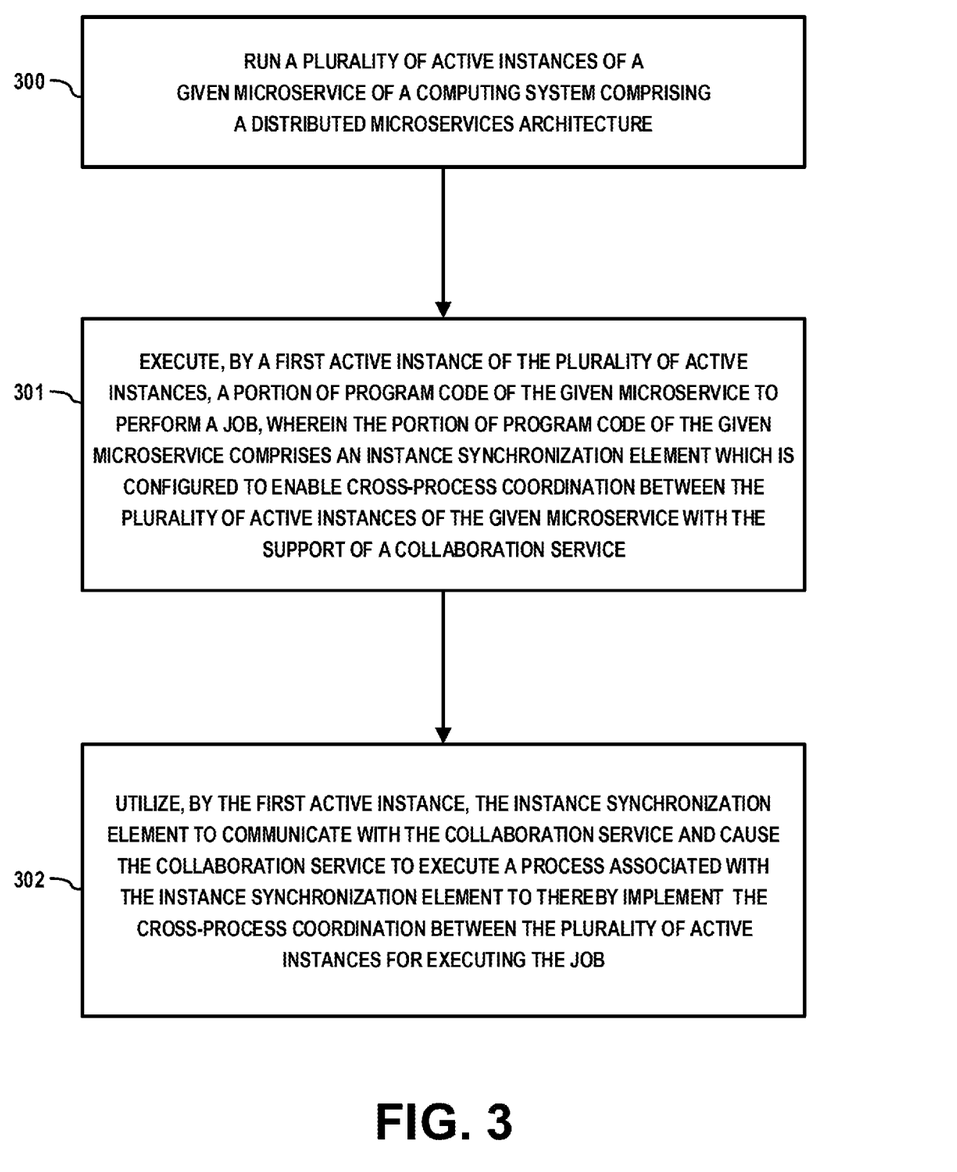
FIG. 3 is a flow diagram of method for enabling cross-process coordination between instances of a given microservice using instance synchronization elements that are inserted into the microservice program code, according to an exemplary embodiment of the disclosure.

FIG. 3 is a flow diagram of method for enabling cross-process coordination between instances of a given microservice using instance synchronization elements that are inserted into the microservice program code, according to an exemplary embodiment of the disclosure. The method comprises running a plurality of active instances of a given microservice of a computing system comprising a distributed microservices architecture (block 300), executing, by a first active instance, a portion of program code of the given microservice to perform a job, wherein the portion of program code of the given microservice comprises an instance synchronization element which is configured to enable cross-process coordination between the plurality of active instances of the given microservice with the support of a collaboration service (block 301), and utilizing, by the first active instance, the instance synchronization element to communicate with the collaboration service and cause the collaboration service to execute a process associated with the instance synchronization element to thereby implement the cross-process coordination between the plurality of active instances for executing the job (block 302). As noted above, in some embodiments, the instance synchronization element comprises an aspect that configured using an aspect-oriented programming paradigm.

In some embodiments, the instance synchronization element enables (i) the first active instance of the microservice to request a lock on the portion of the program code to be executed to perform the job and (ii) the collaboration service to issue a lock on the portion of the program code so that only one active instance of the microservice performs the job. For example, in response to the request for the lock, the collaboration service issues a lock the first active instance requesting the lock. In some embodiments, in response to request for the lock, the collaboration service proceeds to select an active instance among the plurality of active instances of the given microservice to execute the job and issue the lock to the selected active instance to perform the job.

In some embodiments, instance synchronization element enables (i) the first active instance of the microservice to pass an updated in-memory value of the first active instance to the collaboration service and (ii) the collaboration service to broadcast the updated in-memory value to other active instances of the given microservice. In some embodiments, the instance synchronization element is included in a setter process of the portion of the program code executed by the first active instance. In some embodiments, the instance synchronization element is included in a log level setting process of the portion of the program code executed by the first active instance.

Figure 4:
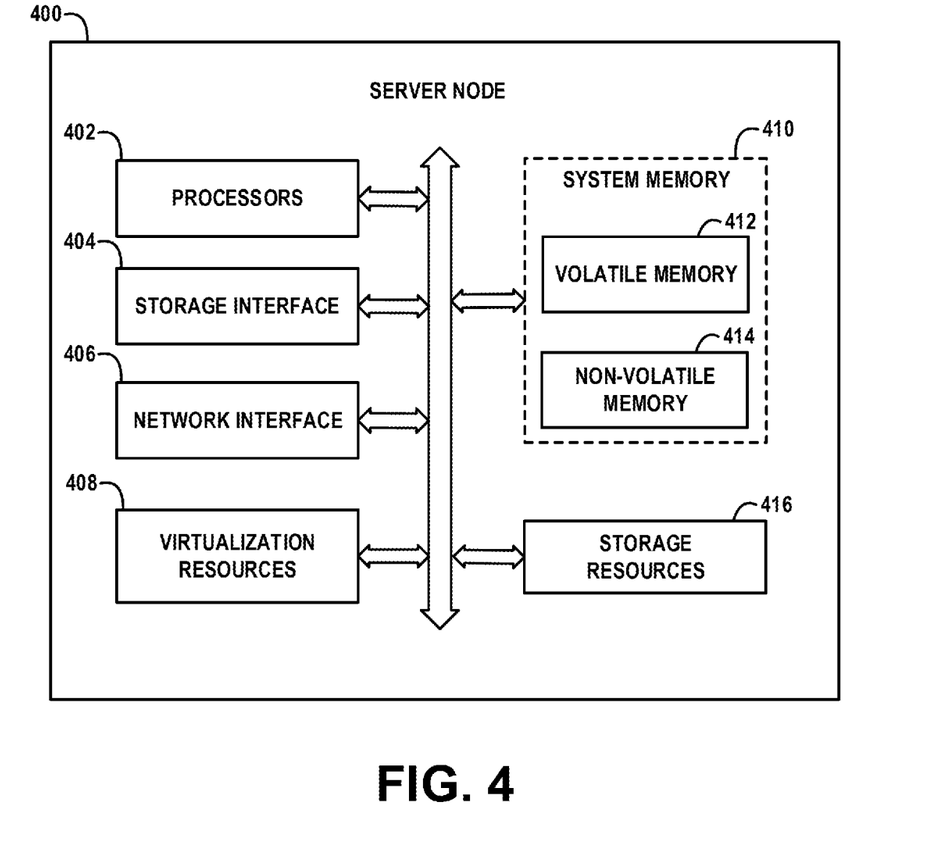
FIG. 4 schematically illustrates a framework of a server node which can be implemented for hosting components of the cloud computing system of FIG. 1, according to an exemplary embodiment of the disclosure.

It is to be understood that the various software modules of the cloud computing system 130 of FIG. 1 can be implemented on one or more server nodes. For example, FIG. 4 schematically illustrates a framework of a server node which can be implemented for hosting one or more modules services, system, etc. of the cloud computing system 130 of FIG. 1, according to an exemplary embodiment of the disclosure. The server node 400 comprises processors 402, storage interface circuitry 404, network interface circuitry 406, virtualization resources 408, system memory 410, and storage resources 416. The system memory 410 comprises volatile memory 412 and non-volatile memory 414.

The processors 402 comprise one or more types of hardware processors that are configured to process program instructions and data to execute a native operating system (OS) and applications that run on the server node 400. For example, the processors 402 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 404 enables the processors 402 to interface and communicate with the system memory 410, the storage resources 416, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 406 enables the server node 400 to interface and communicate with a network and other system components. The network interface circuitry 406 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 408 can be instantiated to execute one or more services or functions which are hosted by the server node 400. For example, the virtualization resources 408 can be configured to implement the various services, modules and functionalities of the cloud computing system 130 of FIG. 1 as discussed herein. In one embodiment, the virtualization resources 408 comprise virtual machines that are implemented using a hypervisor platform which executes on the server node 400, wherein one or more virtual machines can be instantiated to execute functions of the server node 400. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 400, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 408 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 400 as well the various modules and functionalities of the computing system 130 of FIG. 1 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various services and modules of the cloud computing system 130 comprise program code that is loaded into the system memory 410 (e.g., volatile memory 412), and executed by the processors 402 to perform respective functions as described herein. In this regard, the system memory 410, the storage resources 416, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 410 comprises various types of memory such as volatile RAM, NVRAM, or other types of memory, in any combination. The volatile memory 412 may be a dynamic random-access memory (DRAM) (e.g., DRAM DIMM (Dual In-line Memory Module), or other forms of volatile RAM. The non-volatile memory 414 may comprise one or more of a NAND Flash storage device, a SSD device, or other types of next generation non-volatile memory (NGNVM) devices. The system memory 410 can be implemented using a hierarchical memory tier structure wherein the volatile system memory 412 is configured as the highest-level memory tier, and the non-volatile system memory 414 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 402 to execute a native operating system and one or more applications or processes hosted by the server node 400, and to temporarily store data that is utilized and/or generated by the native OS and application programs and processes running on the server node 400. The storage resources 416 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
running a plurality of active instances of a given microservice of a computing system comprising a distributed microservices architecture;
executing, by a first active instance of the plurality of active instances, program code of the given microservice to perform a job;
reaching, by the first active instance, a point in the executing program code of the given microservice that comprises an instance synchronization element which comprises an associated process that is configured to enable a collaboration service to implement cross-process coordination between the plurality of active instances of the given microservice to perform the job with the support of the collaboration service; and
utilizing, by the first active instance, the instance synchronization element to communicate with the collaboration service and cause the collaboration service to execute the process associated with the instance synchronization element to thereby implement the cross-process coordination between the plurality of active instances to perform the job.

2. The method of claim 1, wherein the instance synchronization element comprises an aspect that configured using an aspect-oriented programming paradigm.

3. The method of claim 1, wherein the instance synchronization element (i) enables the first active instance of the given microservice to request a lock on a portion of the program code to be executed to perform the job and (ii) enables the collaboration service to issue a lock on the portion of the program code so that only one active instance of the given microservice performs the job.

4. The method of claim 3, wherein in response to the request for the lock, the collaboration service issues the lock to the first active instance requesting the lock.

5. The method of claim 3, wherein in response to the request for the lock, the collaboration service selects an active instance among the plurality of active instances of the given microservice to perform the job, and issues the lock to the selected active instance to perform the job.

6. The method of claim 1, wherein the instance synchronization element (i) enables the first active instance of the given microservice to pass an updated in-memory value of the first active instance to the collaboration service and (ii) enables the collaboration service to broadcast the updated in-memory value to other active instances of the given microservice.

7. The method of claim 6, wherein the instance synchronization element is included in a setter process of the program code executed by the first active instance.

8. The method of claim 6, wherein the instance synchronization element is included in a log level setting process of the program code executed by the first active instance.

9. An article of manufacture comprising a non-transitory processor-readable storage medium having stored therein program code of one or more software programs, wherein the program code when executed by one or more processors causes the one or more processors to implement a method comprising:
running a plurality of active instances of a given microservice of a computing system comprising a distributed microservices architecture;
executing, by a first active instance of the plurality of active instances, program code of the given microservice to perform a job;
reaching, by the first active instance, a point in the executing program code of the given microservice that comprises an instance synchronization element which comprises an associated process that is configured to enable a collaboration service to implement cross-process coordination between the plurality of active instances of the given microservice to perform the job with the support of the collaboration service; and
utilizing, by the first active instance, the instance synchronization element to communicate with the collaboration service and cause the collaboration service to execute the process associated with the instance synchronization element to thereby implement the cross-process coordination between the plurality of active instances to perform the job.

10. The article of manufacture of claim 9, wherein the instance synchronization element comprises an aspect that configured using an aspect-oriented programming paradigm.

11. The article of manufacture of claim 9, wherein the instance synchronization element (i) enables the first active instance of the given microservice to request a lock on a portion of the program code to be executed to perform the job and (ii) enables the collaboration service to issue a lock on the portion of the program code so that only one active instance of the given microservice performs the job.

12. The article of manufacture of claim 11, wherein in response to the request for the lock, the collaboration service issues the lock to the first active instance requesting the lock.

13. The article of manufacture of claim 11, wherein in response to the request for the lock, the collaboration service selects an active instance among the plurality of active instances of the given microservice to perform the job, and issues the lock to the selected active instance to perform the job.

14. The article of manufacture of claim 9, wherein the instance synchronization element (i) enables the first active instance of the given microservice to pass an updated in-memory value of the first active instance to the collaboration service and (ii) enables the collaboration service to broadcast the updated in-memory value to other active instances of the given microservice.

15. The article of manufacture of claim 14, wherein the instance synchronization element is included in a setter process of the program code executed by the first active instance.

16. The article of manufacture of claim 14, wherein the instance synchronization element is included in a log level setting process of the program code executed by the first active instance.

17. A server node, comprising:

at least one processor; and system memory configured to store program code, wherein the program code when executed by the at least one processor causes the at least one processor to perform a process comprising:

running a plurality of active instances of a given microservice of a computing system comprising a distributed microservices architecture;

executing, by a first active instance of the plurality of active instances, program code of the given microservice to perform a job;

reaching, by the first active instance, a point in the executing program code of the given microservice that comprises an instance synchronization element which comprises an associated process that is configured to enable a collaboration service to implement cross-process coordination between the plurality of active instances of the given microservice to perform the job with the support of the collaboration service; and utilizing, by the first active instance, the instance synchronization element to communicate with the collaboration service and cause the collaboration service to execute the process associated with the instance synchronization element to thereby implement the cross-process coordination between the plurality of active instances to perform the job.

18. The server node of claim 17, wherein the instance synchronization element comprises an aspect that configured using an aspect-oriented programming paradigm.

19. The server node of claim 17, wherein the instance synchronization element (i) enables the first active instance of the given microservice to request a lock on a portion of the program code to be executed to perform the job and (ii) enables the collaboration service to issue a lock on the portion of the program code so that only one active instance of the given microservice performs the job.

20. The server node of claim 17, wherein the instance synchronization element (i) enables the first active instance of the given microservice to pass an updated in-memory value of the first active instance to the collaboration service and (ii) enables the collaboration service to broadcast the updated in-memory value to other active instances of the given microservice.

* * * * *